Oct. 4, 1932.   D. H. MILLER   1,880,329
TIRE TUBE TESTER
Filed July 29, 1930   2 Sheets-Sheet 1
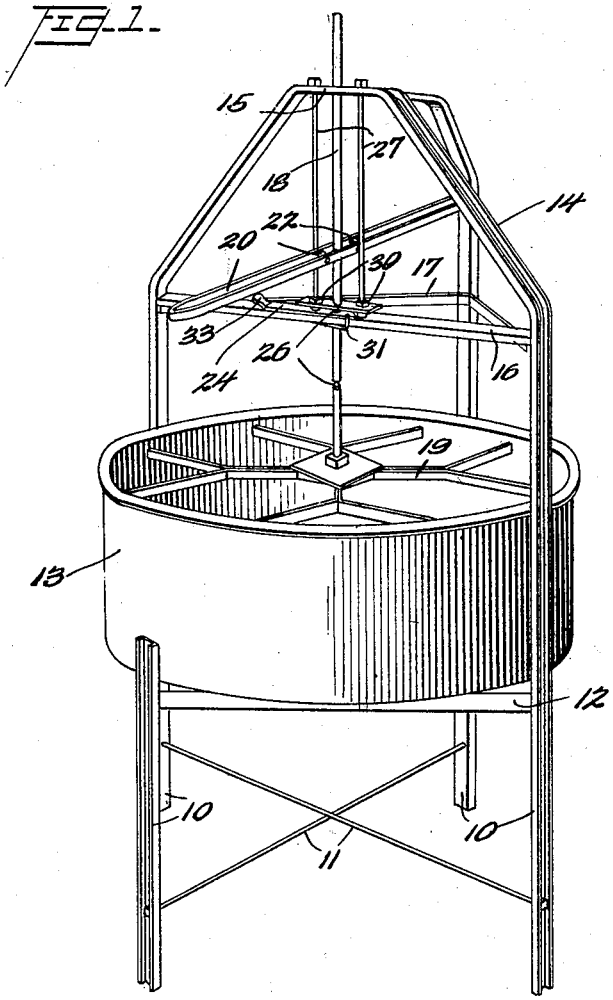
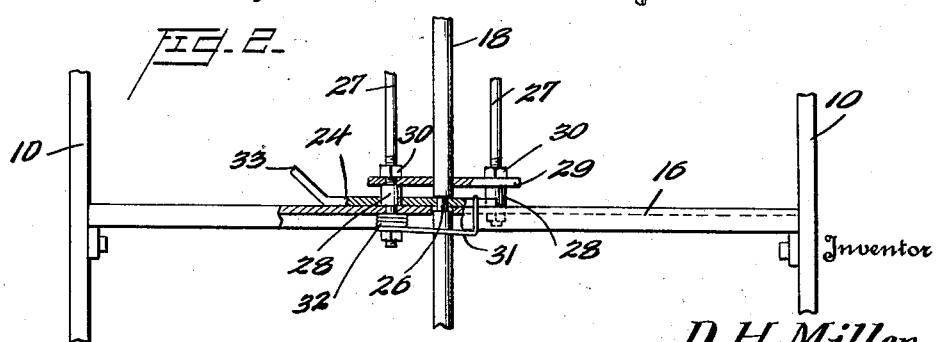
Inventor
D. H. Miller

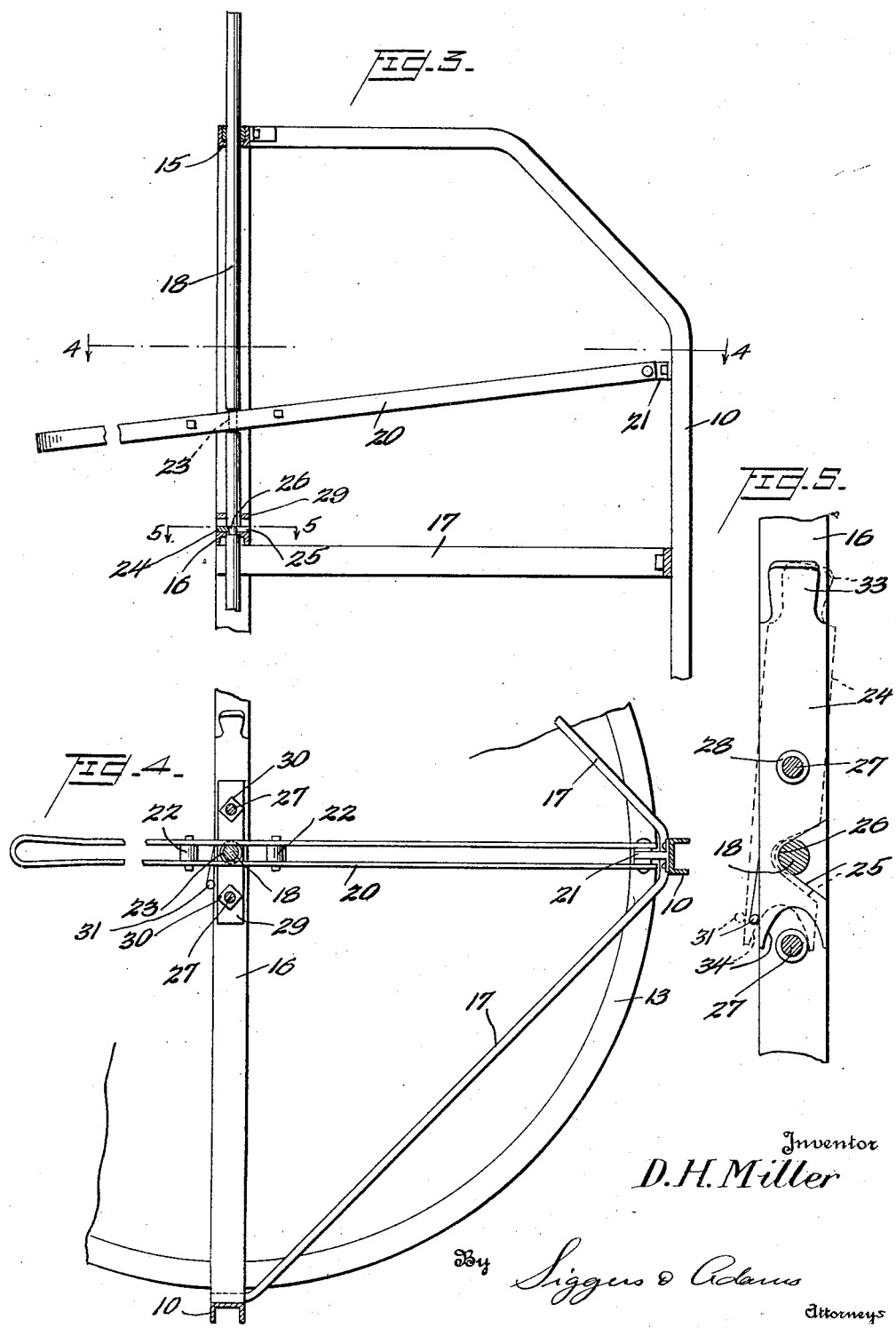

Patented Oct. 4, 1932

1,880,329

UNITED STATES PATENT OFFICE

DANIEL H. MILLER, OF KEARNEY, NEBRASKA

TIRE TUBE TESTER

Application filed July 29, 1930. Serial No. 471,561.

This invention relates to devices for testing inner tubes to locate punctures or air holes and, among other objects, aims to provide an improved, strong and durable device for submerging tubes in water so that any leaks may be quickly and conveniently located.

This application involves certain important improvements on the device shown in my co-pending application, Ser. No. 304,041, filed September 5, 1928.

Other aims and advantages of the invention will appear in the specification when considered in connection with the accompanying drawings, wherein:

Fig. 1 is a perspective view of a testing device embodying the invention;

Fig. 2 is a fragmentary sectional view of parts shown in Fig. 1;

Fig. 3 is a fragmentary vertical sectional view taken through the upper part of Fig. 1;

Fig. 4 is a horizontal sectional view taken on the line 4—4 in Fig. 3; and

Fig. 5 is a fragmentary sectional view taken on the line 5—5 in Fig. 3.

Referring particularly to the drawings, the apparatus is there shown as being supported by a fabricated frame having legs 10 preferably made of small structural steel channels suitably braced near their lower ends by diagonal rods 11.

Connecting bars 12 in the form of a bent piece of strap metal are shown as being riveted to the legs at a suitable height to provide a supporting frame or table for a tank 13.

One of the legs 10 extends only a short distance above the tank supports 12; while the other legs extend above the tank to provide an overhanging superstructure 14. The extension of the short leg acts as a stop to hold the tank properly centered in the frame. In Fig. 1, diagonally opposite legs 10 are shown as being made of one piece which is bent substantially U-shaped to overhang the tank and the third leg is secured at its upper end to them at the top by any suitable means such as an angle bracket. The U-shaped uprights are shown as having a straight horizontal portion 15 at the top.

The superstructure is shown as being braced by a channel 16 connected to the diagonally opposite uprights or extensions of legs 10 and a bent, flat bar 17 connecting these uprights to the other one at the rear. The channel 16 and the horizontal connecting portion 15 of the diagonally opposite uprights are parallel and are arranged directly over the tank 13. In this example, both of these members have openings to guide a stem or plunger 18 which carries a spider 19 at its lower end to engage and submerge an inner tube (not shown) in the tank, the plunger being arranged axially of the tank.

To operate the submerging plunger, there is shown a hand lever or handle 20 made of a U-shaped flat bar having its free ends pivoted to a bracket 21 on the upright or extension of the rear leg 10. The arms of this handle straddle the plunger 18 and are secured in proper spaced relation by rivets or bolts passing through washers 22 so that they engage in a circumferential groove 23 in the plunger (Fig. 3), the arrangement being such that the plunger may be manually operated by manipulating or swinging the handle and the arms of the handle will slide with respect to the plunger as the actuating movement is imparted. This slight sliding movement is due to the fact that the handle swings in an arcuate path. However, the handle may be mounted so that its pivoted end will move as it is manipulated.

The plunger is adapted to be locked automatically in its lowered position and may also be locked in its raised position so that the operator may use both hands to manipulate the tube to be tested. To these ends, a pivoted latch lever 24 having a substantially V-shaped notch 25 is mounted above the web of the channel 16 and the plunger has a pair of appropriately spaced circumferential grooves 26 adapted to be engaged by the latch lever. Herein, a pair of vertical stay rods 27 are connected to the members 15 and 16 on opposite sides of the plunger and the latch lever is pivotally mounted on a spacer sleeve 28 about one of these rods and being confined between the web of the channel and a cross plate 29 secured against the upper ends of sleeves 28 by nuts 30. The cross plate 29 also has a guide hole for the plunger 18 and prevents the grooves 26 from engaging the web of the channel 16 around the guide opening in it.

To cause the latch lever to snap into either of the grooves, a wire spring comprising an L-shaped arm 31 and coil 32 secured to one of the stay rods is arranged to press against the side edge of the latch lever opposite from the notched side, as shown in Fig. 5. The lever has an upwardly bent handle portion 33 so that it may easily be grasped by the operator and pushed to swing it out of locking position against the pressure of the spring. To limit the unlocking movement of the lever, it is shown as having a U-shaped notch 34 providing a forked end straddling the spacer sleeve 28 on one of the stay rods (Fig. 5). The plunger acts as a stop to prevent movement of the lever in the opposite direction.

The operation of the device is quite simple. It is only necessary to raise the submerger plunger until the latch snaps into the lower groove 26, then the operator places a tube in the tank previously partially filled with water, unlocks the latch by pushing on its handle portion and lowers the operating lever or handle until the latch lever snaps into the upper groove, thus locking the plunger and holding the tube submerged. The operator can then devote his attention solely to locating the leaks, using both hands to turn the tube and mark the places where air bubbles escape.

From the foregoing description, it will be seen that the device is very strong and durable. It is conveniently made of standard structural parts and is portable. There are no delicate parts that are apt to break and require replacement. Any unskilled laborer can operate it and detect leaks in much less time than is required by the old and well known method.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A testing device for inner tubes comprising, in combination, a structural frame having channel-shaped uprights and presenting a table portion; some of said uprights extending above the table portion to provide an overhanging superstructure portion; a tank removably mounted in the table portion below the superstructure portion; a submerger including a spider having a plunger rod slidably mounted in the superstructure portion; a hand lever pivoted to the superstructure portion; means connecting the lever to said plunger rod; and spring urged latch means cooperating with the plunger rod to lock the submerger in either raised or lowered position.

2. A testing device for inner tubes comprising, in combination, a structural frame having channel-shaped uprights and presenting a tank supporting portion; some of said uprights extending above the tank supporting portion to provide a superstructure portion; a tank removably mounted in the tank supporting portion below the superstructure; a submerger having a vertical plunger rod slidably mounted in the superstructure portion above the tank; a substantially U-shaped lever pivotally connected to one member of the superstructure portion; means connecting the lever to said plunger rod; said plunger rod having spaced circumferential grooves therein; and a spring-urged latch lever pivotally connected to the superstructure portion adjacent to said plunger rod and having means to engage in the respective grooves whereby to lock the submerger in either its raised or its lowered position.

3. A testing device of the character described comprising, in combination, a frame having channel-shaped uprights and presenting a tank supporting portion; some of said uprights extending above the tank supporting portion to provide a superstructure; a tank mounted on the tank supporting portion below the superstructure; a diagonal brace on said superstructure connected to two of said uprights and having a guide opening; a submerger having an operating stem slidably mounted in the superstructure and in said guide opening in said diagonal brace; an operating lever pivotally mounted on the superstructure and connected to said stem; a pair of tie-rods arranged vertically on opposite sides of the stem and connected to said diagonal brace member; a plate carried by the tie-rods and also having a guide opening for said stem; spacer means between said plate and said diagonal brace member; said stem having circumferential grooves; and a spring-urged latch lever pivotally connected to one of said tie-rods between the diagonal brace member and said plate and having a notched portion adapted to engage said circumferential grooves in the stem whereby to lock the submerger in either raised or lowered position.

4. A testing device of the character described comprising, in combination, a frame having channel-shaped uprights and presenting a tank supporting portion; some of said uprights extending above the tank supporting portion to provide a superstructure; a tank mounted on the tank supporting portion below the superstructure; a diagonal brace on said superstructure connected to two of said uprights and having a guide opening; a submerger having an operating stem slidably mounted in the superstructure and in said guide opening in said diagonal brace; an operating lever pivotally mounted on the superstructure and connected to said stem; a pair of tie-rods arranged vertically on opposite sides of the stem and connected to said diagonal brace member; a plate carried by the tie-rods and also having a guide opening for said stem; spacer means on the tie rods between said plate and said diagonal brace member; said stem having circumferential grooves; a latch lever between said diagonal brace member and said plate, said latch lever being pivotally connected to one of said tie-rods and having a V-shaped notch engageable with said circumferential grooves in the stem; a spring connected to one of said tie-rods and engageable with the latch lever normally to urge the latch lever toward its locking position; the free end of the lever being forked and arranged to engage the spacer means about the other tie-rod to limit the unlocking movement of said latch lever.

In testimony, that I claim the foregoing as my own, I have hereto affixed my signature.

DANIEL H. MILLER.